US010762023B2

(12) United States Patent
Olarig et al.

(10) Patent No.: US 10,762,023 B2
(45) Date of Patent: *Sep. 1, 2020

(54) SYSTEM ARCHITECTURE FOR SUPPORTING ACTIVE PASS-THROUGH BOARD FOR MULTI-MODE NMVE OVER FABRICS DEVICES (71) Applicant: Samsung Electronics Co., Ltd., Suwon-si, Gyeonggi-do (KR)

(72) Inventors: Sompong Paul Olarig, Pleasanton, CA (US); Fred Worley, San Jose, CA (US); Son Pham, San Ramon, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,248

(22) Filed: May 20, 2019

(65) Prior Publication Data
US 2019/0272247 A1 Sep. 5, 2019

Related U.S. Application Data (63) Continuation of application No. 15/459,482, filed on Mar. 15, 2017, now Pat. No. 10,387,353, which is a (Continued)

(51) Int. Cl.
G06F 13/42 (2006.01)
G06F 13/40 (2006.01)

(52) U.S. Cl.
CPC ...... G06F 13/4068 (2013.01); G06F 13/4022 (2013.01); G06F 13/4282 (2013.01); G06F 2213/0026 (2013.01)

(58) Field of Classification Search
CPC ............. G06F 13/4022; G06F 13/4068; G06F 13/4282; G06F 2213/0026
See application file for complete search history.

(56) References Cited

U.S. PATENT DOCUMENTS 7,480,303 B1 1/2009 Ngai
9,430,412 B2 8/2016 Huang
(Continued)

FOREIGN PATENT DOCUMENTS

CN 101847429 B * 5/2012
CN 101847429 B 5/2012
(Continued)

OTHER PUBLICATIONS

Moro et al., "SSD series for enterprise use with configurable specifications to flexibly accommodate applications", Toshiba Review Global Edition, vol. 1, No. 2, Dec. 1, 2015.
(Continued)

Primary Examiner — Jing-Yih Shyu
(74) Attorney, Agent, or Firm — Innovation Counsel LLP (57) ABSTRACT A rack-mounted system includes a chassis, a switchless board disposed in the chassis, a midplane, and a plurality of device ports. The switchless board includes a baseboard management controller (BMC), a network repeater configured to transport network signals, and a PCIe switch configured to transport PCIe signals. Each of the plurality of device ports is configured to connect a storage device to the midplane and carry the network signals and the PCIe signals over the midplane. The storage device is configurable to operate in one of multiple storage protocol modes based on a type of the chassis. The network repeater of the switchless board is swappable with an Ethernet switch to provide a switching compatibility to the chassis using the same midplane. The storage device can operate in single-port and dual-port configurations.

16 Claims, 7 Drawing Sheets

Related U.S. Application Data continuation-in-part of application No. 15/403,088, filed on Jan. 10, 2017, now Pat. No. 10,210,123.

(60) Provisional application No. 62/450,436, filed on Jan. 25, 2017, provisional application No. 62/420,355, filed on Nov. 10, 2016, provisional application No. 62/366,622, filed on Jul. 26, 2016.

(56) References Cited

U.S. PATENT DOCUMENTS

| | | | |
|---|---|---|---|
| 9,785,346 B2* | 10/2017 | Yost | G06F 3/0631 |
| 9,934,173 B1* | 4/2018 | Sakalley | G06F 13/1673 |
| 2005/0024125 A1 | 2/2005 | McNitt et al. | |
| 2005/0025125 A1* | 2/2005 | Kwan | H04L 63/10 |
| | | | 370/352 |
| 2013/0086311 A1 | 4/2013 | Huang et al. | |
| 2015/0178095 A1* | 6/2015 | Balakrishnan | G06F 13/364 |
| | | | 710/110 |
| 2015/0254003 A1 | 9/2015 | Lee et al. | |
| 2015/0254088 A1 | 9/2015 | Chou et al. | |
| 2015/0261446 A1 | 9/2015 | Lee | |
| 2016/0041762 A1 | 2/2016 | Kanno et al. | |
| 2016/0092390 A1* | 3/2016 | Grothen | G06F 13/4081 |
| | | | 710/300 |
| 2016/0146754 A1* | 5/2016 | Prasad | G01N 27/447 |
| | | | 204/547 |
| 2016/0188313 A1* | 6/2016 | Dubal | G06F 8/654 |
| | | | 717/172 |
| 2016/0259568 A1 | 9/2016 | Grimsrud et al. | |
| 2016/0283428 A1* | 9/2016 | Guddeti | G06F 13/4027 |
| 2016/0291866 A1 | 10/2016 | Olcay et al. | |
| 2017/0068628 A1* | 3/2017 | Calciu | G06F 13/4022 |
| 2017/0168943 A1* | 6/2017 | Chou | G06F 12/0833 |
| 2018/0004695 A1* | 1/2018 | Chu | G06F 13/16 |

FOREIGN PATENT DOCUMENTS

| | | |
|---|---|---|
| CN | 104021107 A | 9/2014 |
| CN | 104333586 A | 2/2015 |

OTHER PUBLICATIONS

Yongseok Son et al., "An empirical evaluation of NVM express SSD", Cloud and Autonomic Computing (ICCAC), 2015 Int. Conf., Sep. 22, 2015.

Sivashankar, "Design and implementation of non-volatile memory express", Recent Trends in Information Technology (ICRTIT), 2014 Int. Conf., Apr. 10, 2013.

"MicroTCA Rapid Development Platform" DS-MBDP Rev. 0.5, Apr. 2011; www.bittware.com.

* cited by examiner

SYSTEM ARCHITECTURE FOR SUPPORTING ACTIVE PASS-THROUGH BOARD FOR MULTI-MODE NMVE OVER FABRICS DEVICES

CROSS-REFERENCE TO RELATED APPLICATION(S)

This application is a continuation of U.S. patent application Ser. No. 15/459,482 now U.S. Pat. No. 10,387,353, filed Mar. 15, 2017, which is a continuation-in-part of U.S. patent application Ser. No. 15/403,088, now U.S. Pat. No. 10,210,123, filed Jan. 10, 2017 and claims the benefits of and priority to Provisional Patent Application Ser. No. 62/366,622 filed Jul. 26, 2016 and entitled "SELF-CONFIGURING SSD MULTI-PROTOCOL SUPPORT IN HOST-LESS ENVIRONMENT," 62/420,355 filed Nov. 10, 2016 and entitled "MODULAR SYSTEM ARCHITECTURE FOR SUPPORTING MULTI-PATH AND/OR MULTI-MODE NMVE OVER FABRICS DEVICES," and 62/450,436 filed Jan. 25, 2017 and entitled "SYSTEM ARCHITECTURE FOR SUPPORTING ACTIVE PASS-THROUGH BOARD FOR MULTI-MODE NMVE OVER FABRICS DEVICES," the disclosures of which are incorporated herein by reference in their entirety.

TECHNICAL FIELD

The present disclosure relates generally to network-attached devices, more particularly, to a system architecture for supporting an active path-through board for multi-mode NVMe over Fabrics (NVMeoF) devices.

BACKGROUND

Non-volatile memory express (NVMe) and NVMe over fabrics (NVMeoF) (or NVMf in short) are new emerging technologies. NVMe is a standard that defines a register-level interface for host software to communicate with a non-volatile memory subsystem (e.g., a solid-state drive (SSD)) over a peripheral component interconnect express (PCIe) bus.

NVMeoF defines a common architecture that supports an NVMe block storage protocol over a wide range of storage networking fabrics such as Ethernet, Fibre Channel, InfiniBand, and other network fabrics. For an NVMeoF-based system, an X86-based central processing unit (CPU) on a motherboard is no longer required to move data between an initiator (e.g., host software) and a target device (i.e., an NVMeoF device) because the target device is capable of moving data by itself. The term "fabric" represents a network topology in which network nodes can pass data to each other through a variety of interconnecting protocols, ports, and switches. For example, Ethernet-attached SSDs may attach directly to a fabric, and in this case the fabric is the Ethernet.

Today's Ethernet switch boards are designed to accommodate Ethernet-attached SSDs have a high port count because a single switch controller with a high port count would bring the average cost-per-port down. For example, an Ethernet switch can commonly have 128 ports for 25G Ethernet switching. A typical Ethernet SSD rack chassis can consume only 24-48 ports of the 128 ports that are available for the Ethernet switch leaving the remaining 80-104 ports unused. In addition, the mounting of all the available 128 ports is physically impossible due to the spatial limitation of a 2U panel of the Ethernet SSD rack chassis. In these cases, using an Ethernet switch with an excessive number of ports in each Ethernet SSD rack chassis would be wasteful and costly. Mounting of the 128 ports to the chassis may be possible, but it would not be a viable solution in that it requires more rack space and a redesign of the system architecture including the chassis and/or the rack-mounted system as well as the connectors of the attached SSDs.

SUMMARY

According to one embodiment, a rack-mounted system includes a chassis, a switchless board disposed in the chassis, a midplane, and a plurality of device ports. The switchless board includes a baseboard management controller (BMC), a network repeater configured to transport network signals, and a PCIe switch configured to transport PCIe signals. Each of the plurality of device ports is configured to connect a storage device to the midplane and carry the network signals and the PCIe signals over the midplane. The storage device is configurable to operate in one of multiple storage protocol modes based on a type of the chassis. The network repeater of the switchless board is swappable with an Ethernet switch to provide a switching compatibility to the chassis using the same midplane.

According to another embodiment, a switchless board includes: a plurality of device ports configured to connect network-attached storage devices; a baseboard management controller (BMC); a network repeater configured to transport network signals; a PCIe switch configured to transport PCIe signals; and a midplane. Each of the plurality of device ports is configured to connect a respective storage device to the switchless board over the midplane and carry the network signals and the PCIe signals over the midplane. The network-attached storage devices are configurable to operate in one of multiple storage protocol modes based on a type of the chassis. The network repeater of the switchless board is swappable with an Ethernet switch to provide a switching compatibility to the chassis using the same midplane. When the switchless board is configured with the network repeater, the switchless board actively passes through the network signals. When the switchless board is configured with the Ethernet switch, the switchless board provides switching of the network signals.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system architecture for supporting active path-through board for multi-mode NVMe over Fabrics (NVMeoF) devices. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

As used herein, a control plane refers to a functional layer of communication protocol stacks associated with transfer of control information, for example, discovery, routing, path computation, signaling, etc. A data plane refers to another functional layer of communication protocol stacks associated with transfer of data. In the context of data communication, a request to initiate a communication session is exchanged between two parties over a control plane. Once the communication session is established between the two parties, data signals are exchanged between the two parties over a data plane.

The present disclosure describes a system that can support both the NVMe and NVMeoF protocol modes, and various types of fabric-attached SSDs (eSSDs). In some embodiments, an eSSD refers to an SSD that can support the NVMeoF protocols. When configured to support the NVMeoF standard, the system can support various fabrics including not only Ethernet, but also, Fibre Channel, InfiniBand, and other network fabrics. For the convenience of illustration, the following examples and embodiments can show Ethernet-attached NVMeoF devices. However, it is noted that any other type of NVMeoF devices can be used without deviating from the scope of the present disclosure.

The present system provides a single platform and common building blocks that can support both single and dual pathing systems compatible with both NVMe and NVMeoF devices. According to one embodiment, the common building blocks that support single pathing and dual pathing NVMe and NVMeoF devices include a mid-plane, a chassis, and a fan assembly. The present system can scale linearly by adding more similar devices and/or chassis. The present system may also include other building blocks including, but not limited to, a full-width and a half-width switch boards, and an X86 motherboard.

The fabric-attached SSD (eSSD) disclosed herein is a single common device that can be used in multiples systems that are compatible with NVMe and NVMeoF standards. In this sense, the fabric-attached SSD is also referred to as a multi-mode NVMeoF device. The present system provides a platform that can support various types of NVMe and NVMeoF devices in non-high availability (non-HA) mode (i.e., single-path input/output (I/O/)) or HA mode (i.e., multi-path I/O) with minimum hardware changes.

According to one embodiment, the multi-mode NVMeoF device can support either NVMe or NVMeoF standard by detecting product information from a known location. For example, the product information used for self-configuration is stored in the chassis in the form of vital product data (VPD). During the start-up, the multi-mode NVMeoF device can retrieve the VPD from the chassis and configure itself based on the VPD. However, it is noted that the multi-mode NVMeoF device can be configured in various manners without deviating from the scope of the present disclosure. For example, the multi-mode NVMeoF device can be configured by a control command over the PCIe bus issued by a baseboard management controller (BMC) of the switch to which the multi-mode NVMeoF device is connected.

According to one embodiment, the multi-mode NVMeoF device can be configured in a single port NVMe mode, a dual port NVMe mode, a single port NVMeoF mode, and a dual port NVMeoF mode. Table 1 shows example use of the U.2 connector according to the configuration of the multi-mode NVMeoF device. When configured as an NVMe device, the multi-mode NVMeoF device can be configured in either the single port NVMe mode or the dual port NVMe mode. In the single port NVMe mode, the PCIe lanes 0-3 of the U.2 connector are used to carry PCIe signals. In the dual port NVMe mode, the PCIe lanes are split into 2 by 2 lanes; the PCIe lanes 0 and 1 are used for the first port, and the PCIe lanes 2 and 3 are used for the second port. When configured as an NVMeoF device, the multi-mode NVMeoF device can be configured in either the single port NVMeoF mode or the dual port NVMeoF mode. In the single port NVMeoF mode, the PCIe lanes are split into 2 by 2 lanes but only the PCIe lanes 0 and 1 are used to carry PCIe signals, and the PCIe lanes 2 and 3 are not used. The first pair of the SAS port 0 is used for the first Ethernet port (e.g., Ethernet Port A), and the SAS port 1 is not used. In the dual port NVMeoF mode, the PCIe lanes are split into 2 by 2 lanes, and the PCIe lanes 0 and 1 are used as a control plane for the first Ethernet port, and the PCIe lanes 2 and 3 are used as a control plane for the second Ethernet port. The first pair of the SAS port 0 is used for the first Ethernet port (e.g., Ethernet Port A), and the SAS port 1 is used for the second Ethernet port (e.g., Ethernet Port B).

TABLE 1

Example use of U.2 connector

| Configuration | PCIe lanes 0 &1 of U.2 connector | PCIe lanes 2&3 of U.2 connector | PCIe lanes 0-3 of U.2 connector | SAS Port 0 and 1 of U.2 connector |
|---|---|---|---|---|
| Single port NVMe | | | Yes | Not used |
| Dual port NVMe | Yes - used as first port | Yes - used as second port | Split into 2 by 2 lanes | Not used |
| Single port NVMeoF | Yes - used as control plane for first Ethernet port | Not used | Split into 2 by 2 lanes | First pair of SAS port 0 used for first Ethernet port SAS port 1 is not used |
| Dual port NVMeoF | Yes - used as control plane for first Ethernet port | Yes - used as control plane for second Ethernet port | Split into 2 by 2 lanes | First pair of SAS port 0 used for first Ethernet port Second pair of SAS port 1 used for second Ethernet port |

If the product information is stored in a chassis, the two lanes (in a single port mode) or four lanes (in a dual port mode) of the PCIe bus on the U.2 connector are driven by a PCIe engine. In this case, the multi-mode NVMeoF device can disable the Ethernet engine(s), and the NVMe protocols and functionalities are supported or enabled. If the product information is stored in an NVMeoF chassis, the Ethernet ports use only PCIe lanes 2 and 3, or Serial Attached SCSI (SAS) pins depending on the design of the multi-mode NVMeoF device.

The present multi-mode NVMeoF device can operate in two distinct modes, namely, an NVMe mode and an NVMeoF mode. In the NVMe mode, the multi-mode NVMeoF device behaves as an NVMe device. The PCIe pins of the U.2 connector can be connected to the PCIe x4 module 111. The PCIe bus can be used for data and control operations.

In one embodiment, in the NVMeoF mode, the multi-mode NVMeoF device can be configured in a single-path mode or a dual-path mode. In the single path mode, one PCIe x2 is used for a control plane and is connected to one motherboard. In the dual-path mode, two PCIe x2 are used for control planes and are connected to two motherboards.

In another embodiment, the NVMeoF device can use SAS pins for the Ethernet ports in the NVMeoF mode. In the non-HA NVMeoF mode, the two lanes of the PCIe bus are used for standard features through a control plane. In the dual-port HA mode, the four lanes of the PCIe bus are split into two X2 lanes and used for port A and port B, respectively. The existing PCIe software and driver may be used as unmodified for the multi-mode NVMeoF device.

Because the multi-mode NVMeoF device can operate both in the NVMe and NVMeoF modes, the cost for developing and deploying the devices can be reduced because the same devices can be used in the NVMe mode and the NVMeoF mode. For a similar reason, the multi-mode NVMeoF device can have a faster time to the market. The multi-mode NVMeoF device can be used in various products and chassis. The two lanes of the PCIe bus are reserved for standard features through a control plane. A CPU, a BMC, and other devices can use the two lanes of the PCIe bus as a control plane to communicate to each NVMeoF device inside the chassis at no additional cost. An existing NVMe midplane can be used unmodified, and there is no need for a new connector on the NVMeoF device due to additional new pins.

Figure 1:
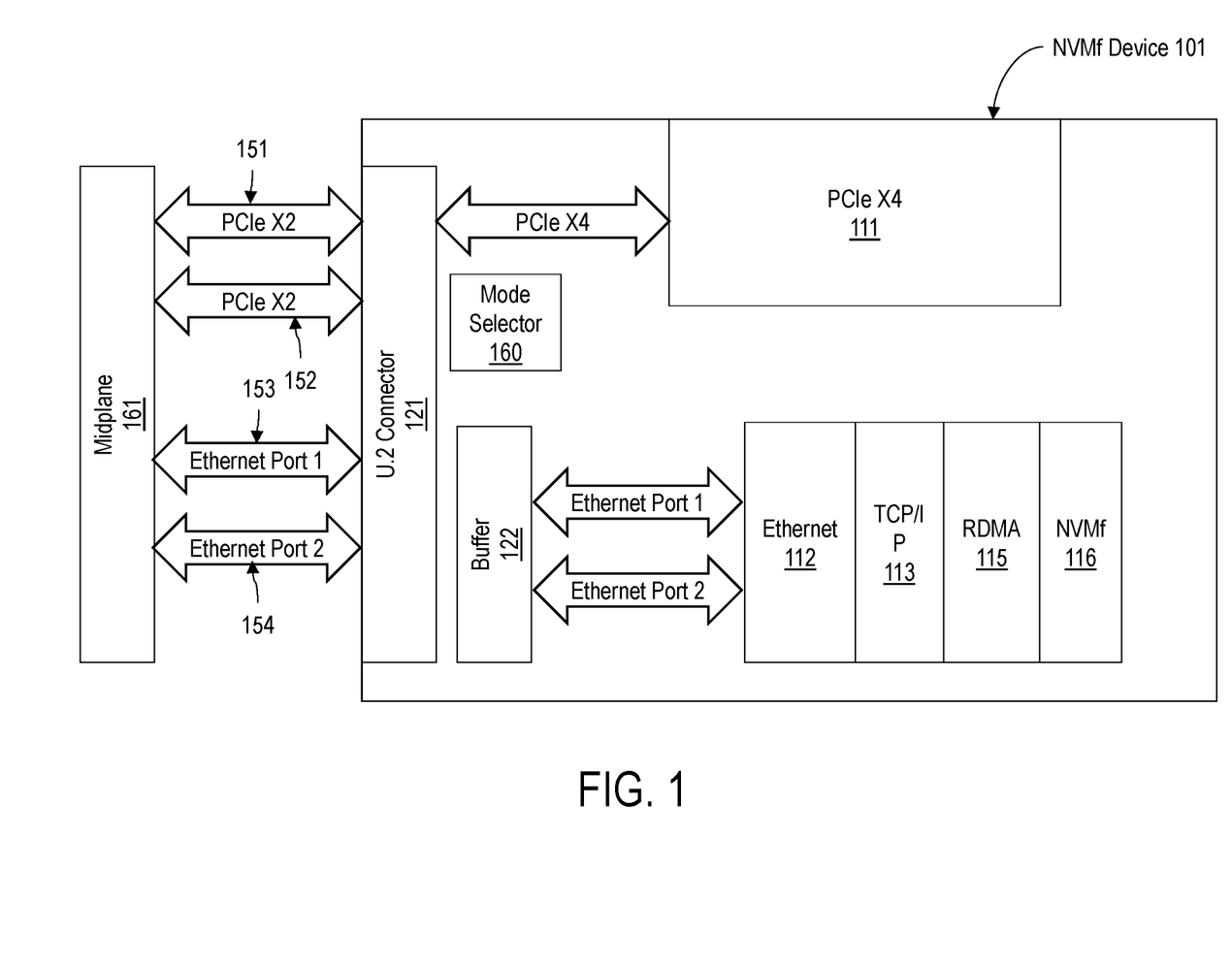
FIG. 1 illustrates a block diagram of an example NVMeoF device, according to one embodiment.

FIG. 1 illustrates a block diagram of an example NVMeoF device, according to one embodiment. The NVMeoF device 101 includes a PCIe X4 module 111 (e.g., PCIe X4 Gen3 module) and various hardware and protocol stacks including, but not limited to, an Ethernet network interface 112, and a TCP/IP offload engine 113, an RDMA controller 115, an NVMeoF protocol stack 116, and a buffer 122. The NVMeoF device 101 can support up to two PCIe X2 buses 151 and 152 and two Ethernet ports 153 and 154 that are connected to a switch motherboard (not shown) over the mid plane 161 depending on a mode of operation. The two PCIe X2 buses 151 and 152 and the two Ethernet ports 153 and 154 are connected to a U.2 connector 121 of the NVMeoF device 101. Ethernet signals are passed to and from the Ethernet network interface 112 via the buffer 122.

According to one embodiment, the NVMeoF device 101 can be configured to as an NVMe device. In the NVMe mode, a mode selector 160 can configure the NVMeoF device 101 to use all of the four lanes (in a single port mode) or only two lanes (in a dual port mode) of the four lanes of the PCIe bus to carry PCIe signals. The PCIe x4 bus is connected to a midplane, and the PCIe bus is shared between data and control signals.

According to another embodiment, the NVMeoF device 101 can be configured as an NVMeoF device. In the NVMeoF mode, the mode selector 160 can configure the NVMeoF device 101 to use the two lanes of the PCIe X2 bus 151 to carry PCIe signals. The operational mode of the NVMeoF device 101 can be self-configured or externally set. For example, the NVMeoF device 101 can self-configure its operational mode using a physical pin (e.g., a presence pin on the chassis of the switch motherboard) or by an in-band command from a BMC (e.g., BMC 201 of FIG. 2) of the switch motherboard. The manageability information retrieved through Ethernet is referred to as "in-band" information whereas the manageability information retrieved through the PCIe bus is referred to as "out-of-band" information.

The NVMeoF device 101 can provide health and sensor status and perform various services including data movement over the PCIe lanes of the PCIe buses 151 and 152 using the existing PCIe X2 bus over the U.2 connector. Examples of the signals that can be pushed include, but are not limited to, health status information, field-replaceable unit (FRU) information, and sensor information of the NVMEOF device 101. Examples of the services that can be pushed over the PCIe buses include, but are not limited to, discovery services to a BMC or a CPU that is local to the switchboard and download services for a new NVMeoF device firmware for performing a firmware upgrade.

The NVMeoF device 101 can provide some device-specific information directly to a BMC of the switch motherboard over the PCIe X2 bus 151 over a control plane established between the switch motherboard and the NVMeoF device 101. Examples of such device-specific information that can be carried over the control plane include, but are not limited to, discovery information and FRU information of the NVMeoF device 101. This can reduce the burden of the BMC for polling the status of the NVMeoF device 101. The device-specific information may be communicated between the NVMeoF device 101 and the BMC using a new device command.

The NVMeoF device 101 can support high availability (HA) multipath I/O with only the two PCIe lanes of the PCIe X2 buses 151 and 152.

Figure 2:
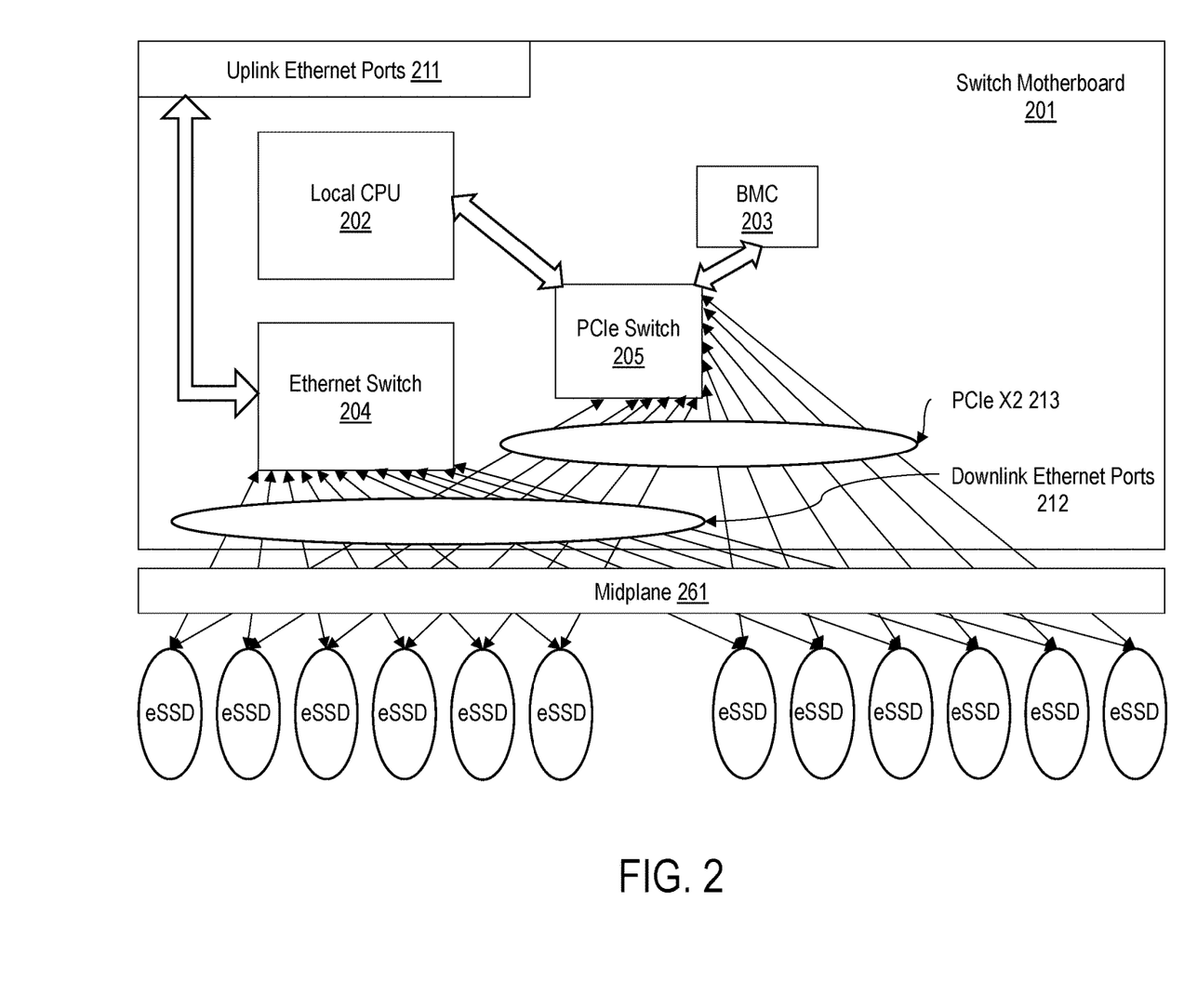
FIG. 2 illustrates a block diagram of an example switch motherboard, according to one embodiment.

FIG. 2 illustrates a block diagram of an example switch motherboard, according to one embodiment. The switch motherboard 201 has an uplink Ethernet ports 211, downlink Ethernet ports 212, a local CPU 202, a BMC 203, an Ethernet switch 204, and a PCIe switch 205. A number of eSSDs can be connected to the switch motherboard 201. According to one embodiment, the eSSD is an NVMeoF device that can be configured to work as an NVMe device or an NVMeoF device depending on the mode of operation. Each of the eSSDs can be connected to the switch motherboard 201 via a U.2 connector as shown in FIG. 1 and configured to connect to the switch motherboard 201 via several high-speed Molex connectors that collectively carry all PCIe X2 bus 213 and the downlink Ethernet ports 212 and other non-high speed control signals such as SMBus, reset, clock, etc. The switch motherboard 201 can provide various signals to each of the eSSDs and perform various services on each of the eSSDs over the PCIe X2 bus 213 and/or the downlink Ethernet ports 212 over the midplane 261. For example, the switch motherboard 201 can receive device-specific information from each of the eSSDs over the Ethernet ports 212, including, but not limited to, health status information, field-replaceable unit (FRU) information, and sensor information of the eSSD. The switch motherboard 201 can also perform various services over the Ethernet ports 212 including, but not limited to, discovery services to a BMC or a local host CPU and download services for a new eSSD firmware for performing a firmware upgrade.

Figure 3:
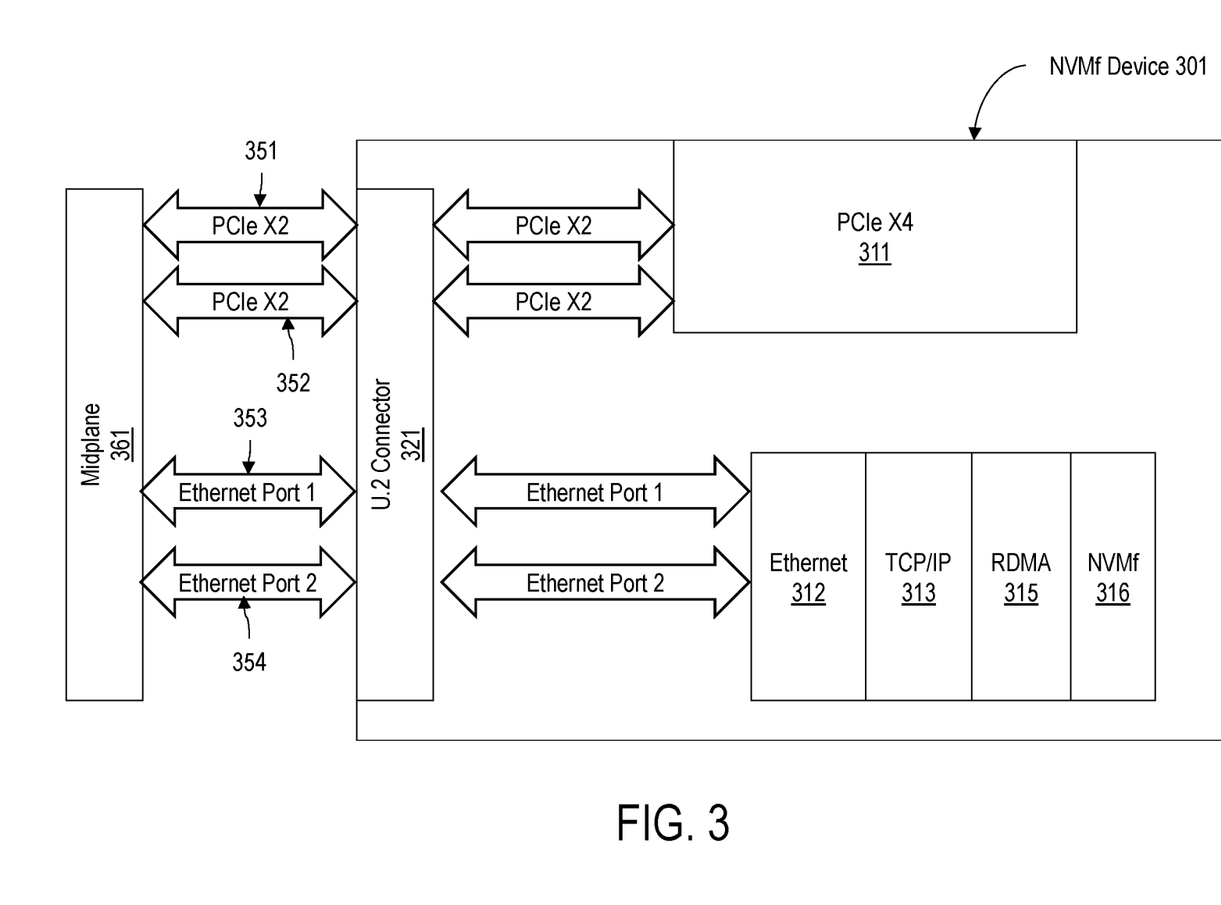
FIG. 3 illustrates a block diagram of an example NVMeoF device, according to another embodiment.

FIG. 3 illustrates a block diagram of an example NVMeoF device, according to another embodiment. The NVMeoF device 301 includes a PCIe X4 module 311 (e.g., PCIe X4 Gen3 module) and various hardware and protocol stacks including, but not limited to, an Ethernet network interface 312, and a TCP/IP offload engine 313, an RDMA controller 315, an NVMeoF protocol stack 316. The NVMeoF device 301 can support two PCIe X2 buses 351 and 352 and two Ethernet ports 353 and 354 that are connected to a switch motherboard (not shown) over the mid plane 361. The PCIe X2 buses 351 and 352 and the two Ethernet ports 353 and 354 are connected to a U.2 connector 321 of the NVMeoF device 301.

According to one embodiment, the NVMeoF device 301 can use the unused SAS pins of the U.2 connector 321 for Ethernet signals instead of using the Ethernet ports 153 and 154 as shown in FIG. 1. Because the NVMeoF device 301 uses the SAS pins for the Ethernet ports 353 and 354, the NVMeoF device 301 can support multi-path I/Os and multiple protocols without suffering from a bandwidth issue.

Figure 4:
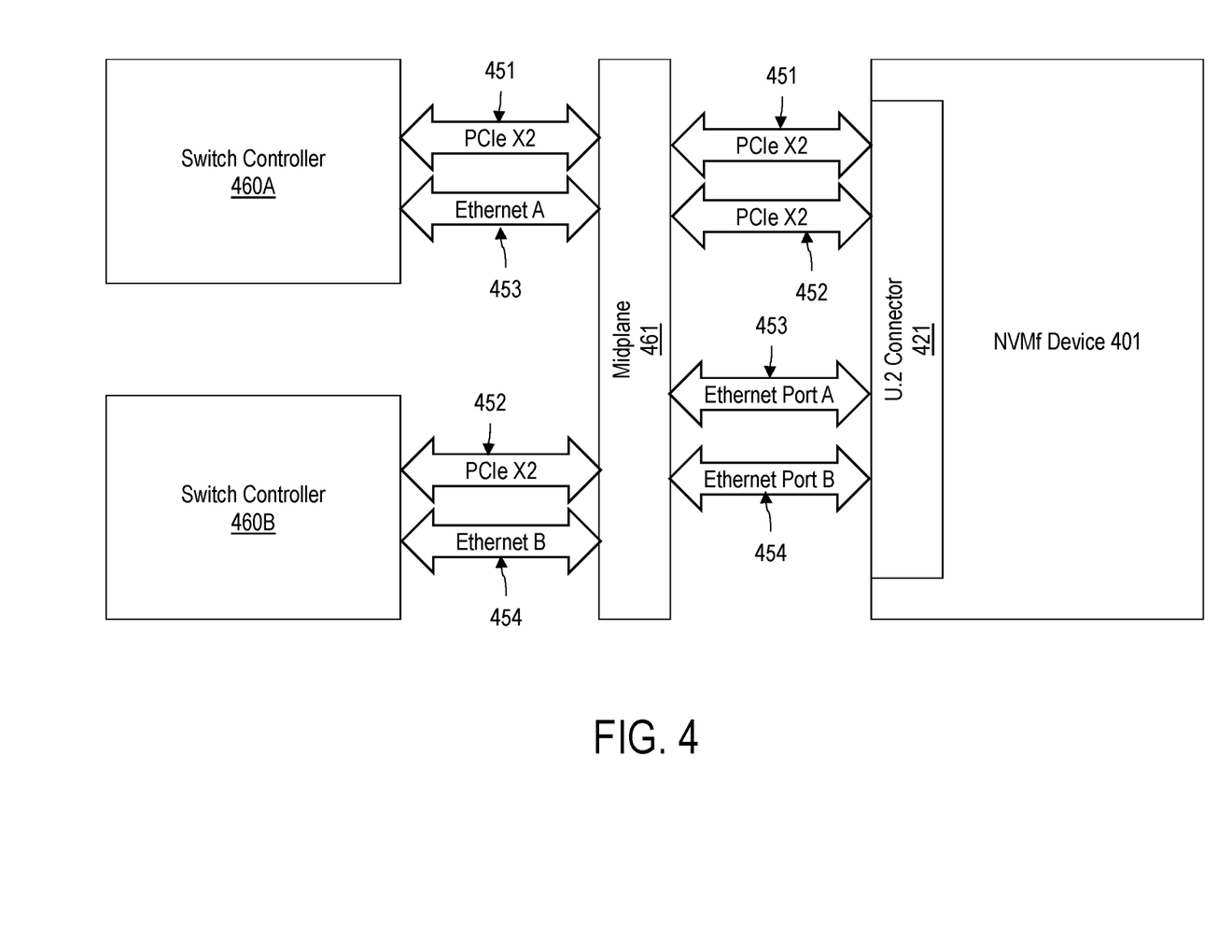
FIG. 4 illustrates a block diagram of an example NVMeoF device configured as an NVMe device operating in a HA mode, according to one embodiment.

FIG. 4 illustrates a block diagram of an example NVMeoF device configured as an NVMe device operating in an HA mode, according to one embodiment. In this example, the NVMeoF device 401 is configured as an NVMe device and can support multi-path I/Os. Two switch boards are required for the HA mode. Both of the switch motherboard 460A and the switch motherboard 460B can be identical. Each of the switch motherboards 460A and 460B can include an Ethernet switch controller (not shown), a PCIe switch, and a BMC. The NVMeoF device 401 is connected to both the switch motherboards 460A and 460B over the midplane 461. The switch motherboard 460A can support two lanes of the PCIe bus and the Ethernet Port A while the switch motherboard 460B can support the remaining two lanes of the PCIe bus and the Ethernet Port B 454. The NVMeoF device 401 can connect to the switch motherboard 460A over the two-lane PCIe bus 451 and the Ethernet Port A 453 via the U.2 connector 421. In addition, the NVMeoF device 401 can connect to the switch motherboard 460B over the two-lane PCIe bus 452 and the Ethernet Port B 454 via the U.2 connector 421 if it is a dual ported device. For a single ported device, the PCIe bus 452 and the Ethernet Port B 454 are not used.

Figure 5:
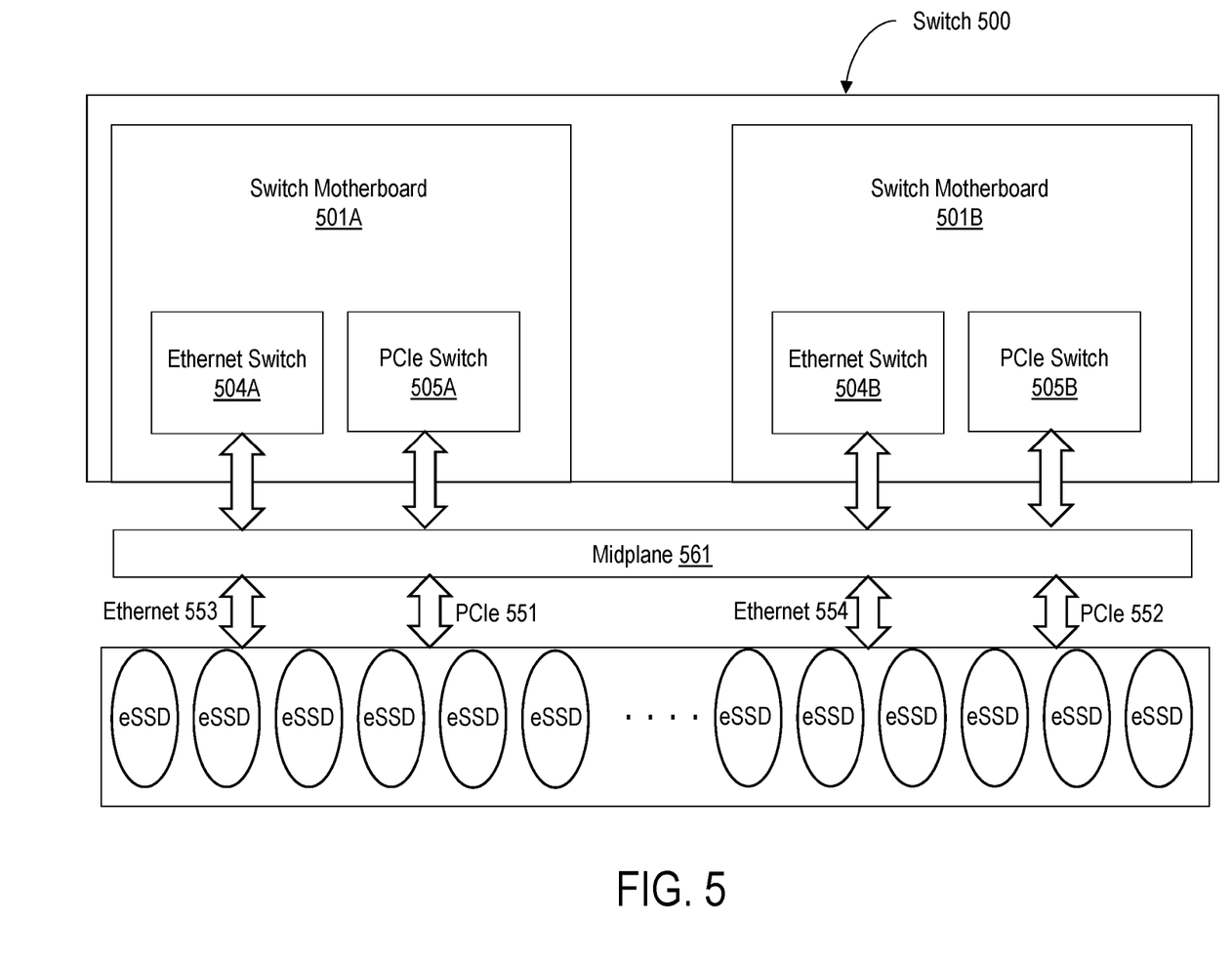
FIG. 5 illustrates a block diagram of an example switch including two switch motherboards, according to one embodiment.

FIG. 5 illustrates a block diagram of an example switch including two switch motherboards, according to one embodiment. The switch 500 includes two switch motherboards 501A and 501B to support multi I/O in a dual port configuration (in an HA mode). The switch motherboard 501A includes an Ethernet switch 504A and a PCIe switch 505A, and the switch motherboard 501B includes an Ethernet switch 504B and a PCIe switch 505B. Each of the switch motherboards 501A and 501B can include other components and modules, for example, a local CPU, a BMC, uplink Ethernet ports, downlink Ethernet ports, etc. as shown in the example switch motherboard 201 shown in FIG. 2.

Several eSSDs can be plugged into device ports of the switch. For example, each of the eSSDs is connected to a U.2 connector on the midplane 561. Each dual port eSSD can connect to both the switch motherboard 501A and the switch motherboard 501B. In the present example, the eSSDs plugged into the switch 500 are configured as an NVMeoF device requiring connectivity to the switch 500 over the midplane 561 via the PCIe bus and the Ethernet ports.

According to one embodiment, the Ethernet signals between the switch 500 and the eSSDs can use SAS pins S2, S3, S5, and S6 for the primary Ethernet port 553 to the switch motherboard 501A. The Ethernet signals can also use S9, S10, S12, and S13 for the secondary Ethernet port 554 to the switch motherboard 501B. The E25 pin of each U.2 connector can be used to enable the dual port configuration. If the E25 pin is disabled, the secondary Ethernet and PCIe are not used. PCIe signals can be carried over to PCIe buses 551 and 552 between the respective switch motherboards 501A and 501B and each of the eSSDs. The eSSD can self-configure its operational mode using a physical pin (e.g., a presence pin on the chassis of the switch) or by an in-band command from a BMC of the switch motherboard.

According to one embodiment, the switch 500 can support 100G Ethernet, and the midplane 561 is a common midplane that can support both an HA mode and a non-HA mode. Depending on the system configuration, signal integrity may need to be tested to ensure that the common midplane 561 can support for both configurations. If the signal integrity is not sufficient, the system can run at a lower operating speed for the Ethernet ports and/or PCIe buses.

The present disclosure describes an Ethernet SSD chassis including an active pass-through switchless board. According to one embodiment, the active pass-through switchless board may not have a built-in Ethernet switch but may have instead a repeater or a pinout translator. The Ethernet chassis can connect to and consume open ports of a switched Ethernet SSD chassis or a top of rack (TOR) switch.

The active pass-through switchless board may not have an Ethernet switch but can provide a control plane, system manageability by the CPU, the BMC, and other devices of the switch board to operate in an NVMeoF mode and a non-HA mode. In the NVMeoF mode and the non-HA mode, two lanes of the PCIe signals are be used for all standard features through the control plane. In an HA mode (dual-port mode), four lanes of the PCIe signals are split into two and are used for port A and port B, respectively.

The present active pass-through switchless board without an Ethernet switch can lower the cost of the system, and offer a lower total cost of ownership (TCO) as a rack solution. The lower cost per chassis can be beneficial to implement various versatile NVMeoF devices that can be used in many products and chassis. Two lanes of the PCIe signals can be used all standard features through the control plane to communicate to NVMeoF devices attached to the chassis at no additional cost.

The present active pass-through switchless board does not require a redesign of the NVMe midplane or new connector for an attached NVMeoF device. Because an existing NVMe midplane can be used without a redesign, the present active pass-through switchless board can achieve a faster time to market providing the benefits described above, for example, the lower cost, simpler design while providing the control plane.

The present active pass-through switchless board can support storage devices that are configurable in multiple modes based on a protocol established over a fabric connection between the rack-mounted system and the storage devices. The network repeater of the motherboard is swappable with an Ethernet switch to function as a switch motherboard using the same midplane to support the same storage devices. The storage devices can operate in single-port and dual-port configurations without changing the system architecture.

Figure 6:
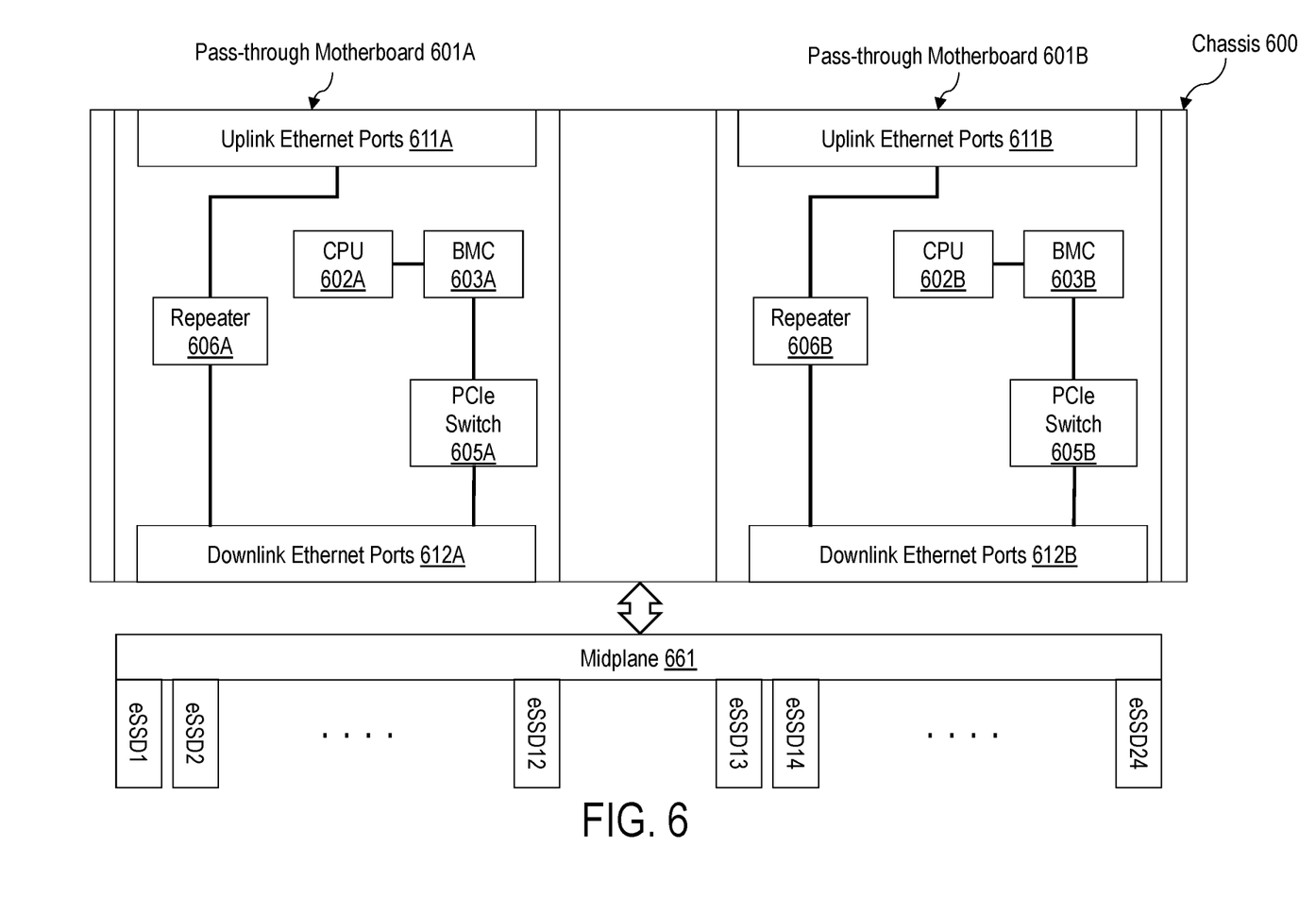
FIG. 6 illustrates a block diagram of an example active pass-through switchless board in a dual port configuration (in a HA mode), according to one embodiment.

FIG. 6 illustrates a block diagram of an example active pass-through switchless board in a dual port configuration (in an HA mode), according to one embodiment. The chassis 600 includes two active pass-through switchless boards 601A and 601B that can support multipath I/O. The active pass-through switchless board 601A includes a repeater 606A and a PCIe switch 605A, and the active pass-through switchless board 601B includes repeater 606B and a PCIe switch 605B. Each of the active pass-through switchless boards 601A and 601B can include other components and modules, for example, a CPU 602, a BMC 603, uplink Ethernet ports 611.

Several eSSDs can be plugged into device ports of the switch. For example, a total of 24 eSSDs are connected to the chassis 600 using a U.2 connector. Each eSSD can connect to both the active pass-through switchless board 601A and the active pass-through switchless board 601B. In the present example, the eSSDs plugged into the chassis 600 are configured as an NVMeoF device requiring connectivity to the chassis 600 over the midplane 661 via the PCIe bus and the Ethernet ports.

According to one embodiment, the chassis 600 can support 100G Ethernet, and the midplane 661 is a common midplane that can support both an HA mode and a non-HA mode. Depending on the system configuration, signal integrity may need to be tested to ensure that the common midplane 661 can support both configurations.

Each of the repeater 606A of the active pass-through switchless board 601A and the repeater 606B of the active pass-through switchless board 601B provides an active pass-through of Ethernet signals between the uplink Ethernet ports 611 and the downlink Ethernet ports 612. For example, the repeater 606A of the active pass-through switchless board 601A can actively (i.e., amplifying signals for a long-range signal transmission) pass through Ethernet signals for not only the eSSDs 1-12 that are attached to the active pass-through switchless board 601A but also the eSSDs 13-24 that are attached to the active pass-through switchless board 601B via the midplane 661. Similarly, the repeater 606B of the active pass-through switchless board 601B can actively pass through Ethernet signals for not only the eSSDs 13-24 that are attached to the active pass-through switchless board 601B but also the eSSDs 1-12 that are attached to the active pass-through switchless board 601A via the midplane 661.

In the HA mode, the PCIe switch 605A of the active pass-through switchless board 601A can use the two PCIe lanes 0 and 1 of the U.2 connector of the attached eSSDs as a control plane for the first Ethernet port. The first pair of SAS port 0 is used for the first Ethernet port (e.g., Ethernet Port A). The PCIe switch 605A of the active pass-through switchless board 601A can communicate with PCIe Port A of all the eSSDs 1-24.

Similarly, in the HA mode, the PCIe switch 605B of the active pass-through switchless board 601B can use the two PCIe lanes 2 and 3 of the U.2 connector of the attached eSSDs as a control plane for the second Ethernet port. The second pair of SAS port 1 is used for the second Ethernet port (e.g., Ethernet Port B). The PCIe switch 605B of the active pass-through switchless board 601B can communicate with the PCIe Port B of all eSSDs 1-24.

Each of the attached eSSDs can provide some device-specific information to the BMC 603 via the PCIe switch 605 over the control plane established between the PCIe switch 605 and the eSSD. Examples of such device-specific information that can be carried over the control plane include, but are not limited to, discovery information and FRU information of the eSSD.

Figure 7:
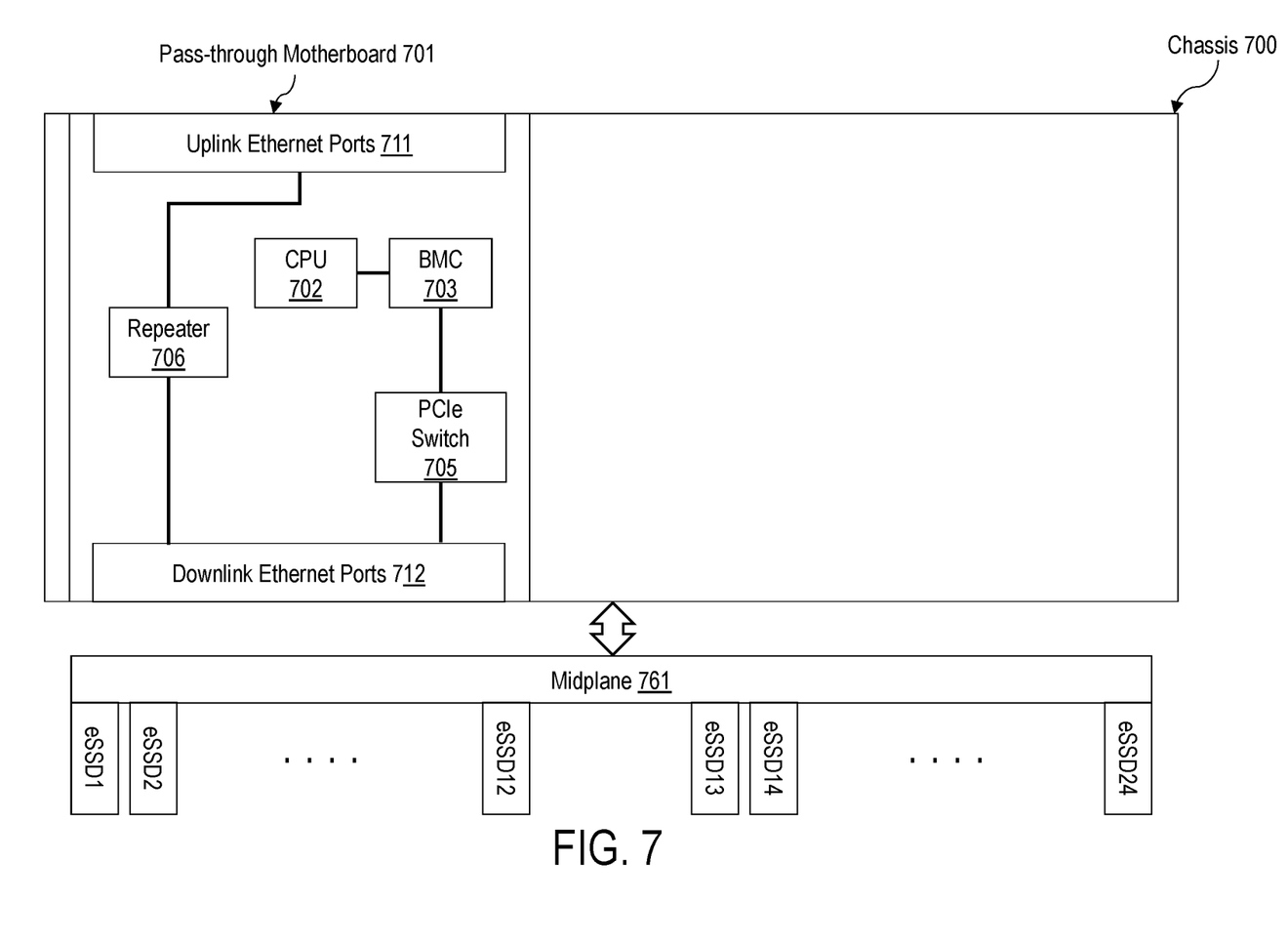
FIG. 7 illustrates a block diagram of an example active pass-through switchless board in a single port configuration (a non-HA mode), according to one embodiment.

FIG. 7 illustrates a block diagram of an example active pass-through switchless board in a single port configuration (a non-HA mode), according to one embodiment. The chassis 700 includes an active pass-through switchless board 701 that can support single port I/O. The active pass-through switchless board 701 includes a CPU 702, a BMC 703, uplink Ethernet ports 711, embedded downlink Ethernet ports 712, a repeater 706, and a PCIe switch 705.

Several eSSDs can be plugged into device ports of the chassis. For example, a total of 24 eSSDs are connected to the chassis 700 using a U.2 connector per a drive slot. In the present example, the eSSDs plugged into the chassis 700 are configured as an NVMeoF device requiring connectivity to the chassis 700 over the midplane 761 via the PCIe bus and the Ethernet ports.

According to one embodiment, the chassis 700 can support 100G Ethernet, and the midplane 761 is a common midplane that can support both an HA mode and a non-HA mode. Depending on the system configuration, signal integrity may need to be tested to ensure that the common midplane 761 can support both configurations. If the signal integrity is not sufficient, the system can either run at a slower speed or use a repeater to run at normal speed.

The repeater 706 of the active pass-through switchless board 701 can provides an active pass-through of Ethernet signals between the uplink Ethernet ports 711 and the downlink Ethernet ports 712. For example, the repeater 706 of the active pass-through switchless board 701 can actively (i.e., amplifying signals for a long-range signal transmission) pass through Ethernet signals for the eSSDs 1-24 that are attached to the active pass-through switchless board 701 via the midplane 761.

In the non-HA mode, the PCIe switch 705 of the active pass-through switchless board 701 can use the two PCIe lanes 0 and 1 of the U.2 connector of the attached eSSDs as a control plane for the first Ethernet port, and the remaining two PCIe lanes 3 and 4 of the U.2 connector are unused. The first pair of SAS port 0 is used for the first Ethernet port (e.g., Ethernet Port A), and the SAS port 1 is unused. The PCIe switch 705 of the active pass-through switchless board 701 can communicate with the eSSDs 1-24 via the PCIe bus.

According to one embodiment, the present active pass-through switchless board (e.g., the active pass-through switchless boards 601A and 601B of FIG. 6 and the active pass-through switchless board 701 of FIG. 7) can include a repeater (e.g., the repeaters 606A and 606B of FIG. 6 and the repeater 706 of FIG. 7). The repeater may be swapped with an Ethernet switch (e.g., the Ethernet switch 204 of FIG. 2 and the Ethernet switches 504A and 504B of FIG. 5) when the motherboard requires an Ethernet switching capability as shown in the examples of FIGS. 2 and 5. Depending on the configurations, the motherboard may function as an Ethernet switching motherboard or an active pass-through switchless board to be compatible with the same midplane with the same connector for the attached eSSDs. The present active pass-through switchless board allows the CPU, the BMC, and other devices integrated in the chassis to use the PCIe bus as a control plane to communicate to the attached eSSDs. An existing NVMe midplane can be used as unmodified to support both NVMe and NVMeoF standards.

According to one embodiment, a rack-mounted system includes a chassis, a switchless board disposed in the chassis, a midplane, and a plurality of device ports. The switchless board includes a baseboard management controller (BMC), a network repeater configured to transport network signals, and a PCIe switch configured to transport PCIe signals. Each of the plurality of device ports is configured to connect a storage device to the midplane and carry the network signals and the PCIe signals over the midplane. The storage device is configurable to operate in one of multiple storage protocol modes based on a type of the chassis. The network repeater of the switchless board is swappable with an Ethernet switch to provide a switching compatibility to the chassis using the same midplane.

The storage device may have a U.2 connector that is configured to connect the storage device to one of the plurality of device ports.

The storage device may support both non-volatile memory express (NVMe) and NVMe over fabrics (NVMeoF) protocol modes, and the type of the chassis corresponds to the NVMe protocol mode or the NVMeoF protocol mode.

The midplane may support both a high availability (HA) mode and a non-HA mode.

The network signals may include device-specific information including one or more of health status information, field-replaceable unit (FRU) information, and sensor information of the storage device, and the storage device may transport the device-specific information to the BMC over the midplane via PCIe lanes that are selected based on a storage protocol mode among the multiple storage protocol modes.

The storage device may be configured to operate in a HA mode or a non-HA mode.

The rack-mounted system may further include two switchless boards including a first switchless board and a second switchless board. A first group of storage devices may be connected to the first switchless board, and a second group of storage devices may be connected to the second switchless board.

The first switchless board may be configured to carry the PCIe signals to the first group of storage devices over a first group of PCIe lanes and carry the PCIe signals to the second group of storage devices over a second group of PCIe lanes.

Each of the switchless boards may provide an active pass-through of the network signals of the first group of storage devices and the second group of storage devices.

The network repeater may be configured to actively pass through the network signals.

According to another embodiment, a switchless board includes: a plurality of device ports configured to connect network-attached storage devices; a baseboard management controller (BMC); a network repeater configured to transport network signals; a PCIe switch configured to transport PCIe signals; and a midplane. Each of the plurality of device ports is configured to connect a respective storage device to the switchless board over the midplane and carry the network signals and the PCIe signals over the midplane. The network-attached storage devices are configurable to operate in one of multiple storage protocol modes based on a type of the chassis. The network repeater of the switchless board is swappable with an Ethernet switch to provide a switching compatibility to the chassis using the same midplane. When the switchless board is configured with the network repeater, the switchless board actively passes through the network signals. When the switchless board is configured with the Ethernet switch, the switchless board provides switching of the network signals.

Each of the network-attached storage devices may have a U.2 connector configured to connect to one of the plurality of device ports.

The network-attached storage devices may support both non-volatile memory express (NVMe) and NVMe over fabrics (NVMeoF) protocol modes, and the type of the chassis corresponds to the NVMe protocol mode or the NVMeoF protocol mode.

The midplane may support both a high availability (HA) mode and a non-HA mode.

The network signals may include device-specific information including one or more of health status information, field-replaceable unit (FRU) information, and sensor information of the network-attached storage devices, and each of the network-attached storage devices may transport the device-specific information to the BMC over the midplane via PCIe lanes that are selected based on a storage protocol mode among the multiple storage protocol modes.

The network-attached storage devices may be configured to operate in a HA mode or a non-HA mode.

The switchless board may be provided in a rack-mounted system including two switchless boards including a first switchless board and a second switchless board. A first group of network-attached storage devices may be connected to the first switchless board, and a second group of network-attached storage devices may be connected to the second switchless board.

The first switchless board may be configured to carry the PCIe signals to the first group of network-attached storage devices over a first group of PCIe lanes and carry the PCIe signals to the second group of network-attached storage devices over a second group of PCIe lanes.

Each of the switchless boards may provide an active pass-through of the network signals of the first group of network-attached storage devices and the second group of network-attached storage devices.

The above example embodiments have been described hereinabove to illustrate various embodiments of implementing a system and method for providing a system architecture for supporting active path-through board for multi-mode NVMeoF devices. Various modifications and departures from the disclosed example embodiments will occur to those having ordinary skill in the art. The subject matter that is intended to be within the scope of the invention is set forth in the following claims.

What is claimed is:

1. A rack-mounted system comprising:
a chassis;
a midplane;
a plurality of uplink network ports configured to receive network signals;
a plurality of device ports, each of the plurality of device ports being configured to connect a non-volatile memory express over fabrics (NVMeoF) device to the midplane;
a first pass-through motherboard disposed in the chassis and comprising a baseboard management controller (BMC) and a first network repeater configured to transport the network signals received from the plurality of uplink ports to the NVMeoF device over the midplane; and
a second pass-through motherboard disposed in the chassis and comprising a second network repeater,
wherein the plurality of device ports includes a first subset of device ports and a second subset of device ports, and
wherein a first group of NVMeoF devices is attachable to the first pass-through motherboard via the first subset of device ports, and a second group of NVMeoF devices is attachable to the first pass-through motherboard via the second subset of device ports.

2. The rack-mounted system of claim 1,
wherein the NVMeoF device is addressable by the network signals.

3. The rack-mounted system of claim 1,
wherein the first network repeater of the first pass-through motherboard passes through the network signals addressed to the first group of NVMeoF devices between the plurality of uplink network ports and the first subset of the plurality of device ports, and
wherein the first network repeater of the first pass-through motherboard passes through the network signals addressed to the second group of NVMeoF devices between the plurality of uplink network ports and the second subset of the plurality of device ports via the midplane.

4. The rack-mounted system of claim 1, wherein one of the first pass-through motherboard or the second pass-through motherboard passes through the network signals to the first group of NVMeoF devices and the second group of NVMeoF devices.

5. The rack-mounted system of claim 1, wherein both of the first pass-through motherboard or the second pass-through motherboard pass through the network signals to the first group of NVMeoF devices and the second group of NVMeoF devices.

6. The rack-mounted system of claim 1, wherein at least one of the first network repeater of the first pass-through motherboard and the second network repeater of the second pass-through motherboard is swappable with an Ethernet switch to provide a switching compatibility to the chassis using the midplane.

7. The rack-mounted system of claim 1, wherein the NVMeoF device has a U.2 connector configured to connect the NVMeoF device to one of the plurality of device ports.

8. The rack-mounted system of claim 1, wherein the midplane supports both a high availability (HA) mode and a non-HA mode.

9. The rack-mounted system of claim 8, wherein the NVMeoF device is configured to operate in a HA mode or a non-HA mode.

10. The rack-mounted system of claim 1, wherein the first pass-through motherboard further comprises a first peripheral component interconnect express (PCIe) switch configured to transport PCIe signals over the midplane.

11. The rack-mounted system of claim 1, wherein the second pass-through motherboard further comprises a second peripheral component interconnect express (PCIe) switch over the midplane.

12. The rack-mounted system of claim 1, wherein the network signals include device-specific information, and the NVMeoF device transports the device-specific information to the BMC over the midplane.

13. The rack-mounted system of claim 12, wherein the first pass-through motherboard further comprises a first peripheral component interconnect express (PCIe) switch configured to transport the device-specific information between the BMC and the midplane over a PCIe lane.

14. The rack-mounted system of claim 12, wherein the second pass-through motherboard further comprises a second peripheral component interconnect express (PCIe) switch configured to transport the device-specific information between the BMC and the midplane over a PCIe lane.

15. The rack-mounted system of claim 12, wherein the NVMeoF device provides the device-specific information to the BMC over a SMBus.

16. The rack-mounted system of claim 12, wherein the device-specific information includes one or more of health status information, field-replaceable unit (FRU) information, and sensor information of the NVMeoF device.

* * * * *